(12) United States Patent
Meindl, Jr.

(10) Patent No.: US 9,265,378 B2
(45) Date of Patent: Feb. 23, 2016

(54) METHOD AND APPARATUS FOR BEVERAGE CAPSULE STORAGE

(71) Applicant: Norman Meindl, Jr., Arvada, CO (US)

(72) Inventor: Norman Meindl, Jr., Arvada, CO (US)

( * ) Notice: Subject to any disclaimer, the term of this patent is extended or adjusted under 35 U.S.C. 154(b) by 411 days.

(21) Appl. No.: 13/742,741

(22) Filed: Jan. 16, 2013

(65) Prior Publication Data

US 2014/0197061 A1    Jul. 17, 2014

(51) Int. Cl.
| | |
|---|---|
| *A47B 83/00* | (2006.01) |
| *B65D 73/00* | (2006.01) |
| *A47J 31/44* | (2006.01) |
| *B65D 85/804* | (2006.01) |

(52) U.S. Cl.
CPC .............. *A47J 31/44* (2013.01); *B65D 85/8043* (2013.01); *Y10T 29/49826* (2015.01)

(58) Field of Classification Search
CPC  B65D 85/8043; A47J 31/44; Y10T 29/49826
USPC ......... 206/433, 460, 523, 524, 564, 591, 592; 99/290, 295; 211/74, 75, 87.01; 220/480, 481, 483; 426/115; 312/237, 312/245, 246, 138.1, 294, 321.5
See application file for complete search history.

(56) References Cited

U.S. PATENT DOCUMENTS

| | | | |
|---|---|---|---|
| 3,442,378 A * | 5/1969 | Wolfe | 206/564 |
| 4,154,795 A | 5/1979 | Thorne | |
| 4,305,512 A | 12/1981 | Mackenzie | |
| 5,062,531 A * | 11/1991 | Coy | 206/564 |
| 5,095,718 A | 3/1992 | Ormond | |
| 5,311,987 A | 5/1994 | Shin | |
| 5,605,389 A | 2/1997 | Kelly | |
| 5,615,780 A | 4/1997 | Nimetz | |
| 5,645,178 A | 7/1997 | Conley | |
| 5,655,673 A * | 8/1997 | Weterrings et al. | 211/75 |
| 5,813,547 A | 9/1998 | Rice | |
| 5,873,486 A * | 2/1999 | Morgan | 220/480 |
| 6,102,204 A * | 8/2000 | Castleberry | 206/523 |
| 6,131,732 A * | 10/2000 | Schneider | 206/523 |
| 6,142,314 A | 11/2000 | Cotterill | |
| 6,287,655 B1 * | 9/2001 | Nichols, Jr. | 206/423 |
| 6,527,113 B2 * | 3/2003 | Blake | 206/523 |
| 6,964,343 B2 | 11/2005 | Tilly | |
| 7,118,001 B2 | 10/2006 | Klein | |
| 7,152,736 B1 | 12/2006 | Menichini | |
| 7,360,661 B2 | 4/2008 | Nickerson | |
| 7,490,727 B2 | 2/2009 | Spiers | |
| 2004/0060946 A1 | 4/2004 | Floyd | |
| 2004/0113529 A1 | 6/2004 | Goldin | |
| 2007/0108145 A1 | 5/2007 | Milardo | |
| 2007/0145868 A1 | 6/2007 | Greiner | |
| 2007/0205168 A1 | 9/2007 | Helvey | |
| 2008/0067139 A1 | 3/2008 | Claypool | |
| 2008/0087618 A1 | 4/2008 | Laney | |
| 2008/0283481 A1 | 11/2008 | Evans | |
| 2009/0145935 A1 | 6/2009 | Kopp | |
| 2010/0219090 A1 | 9/2010 | Thatcher | |
| 2012/0193313 A1 * | 8/2012 | Spurr et al. | 211/59.4 |

* cited by examiner

*Primary Examiner* — Luan K Bui
(74) *Attorney, Agent, or Firm* — Leyendecker & Lemire LLC

(57) ABSTRACT

A beverage capsule storage apparatus and method of use is described. Embodiments of the beverage capsule storage apparatus are typically comprised substantially of a resilient foam panel having a rectangular shape. The foam panel includes a plurality of apertures each adapted to receive a beverage capsule. Beverage capsules include capsules and pods used in single cup brewers. Additionally, an adhesive layer can be included to removably couple the apparatus to a cupboard door or other surface.

19 Claims, 6 Drawing Sheets

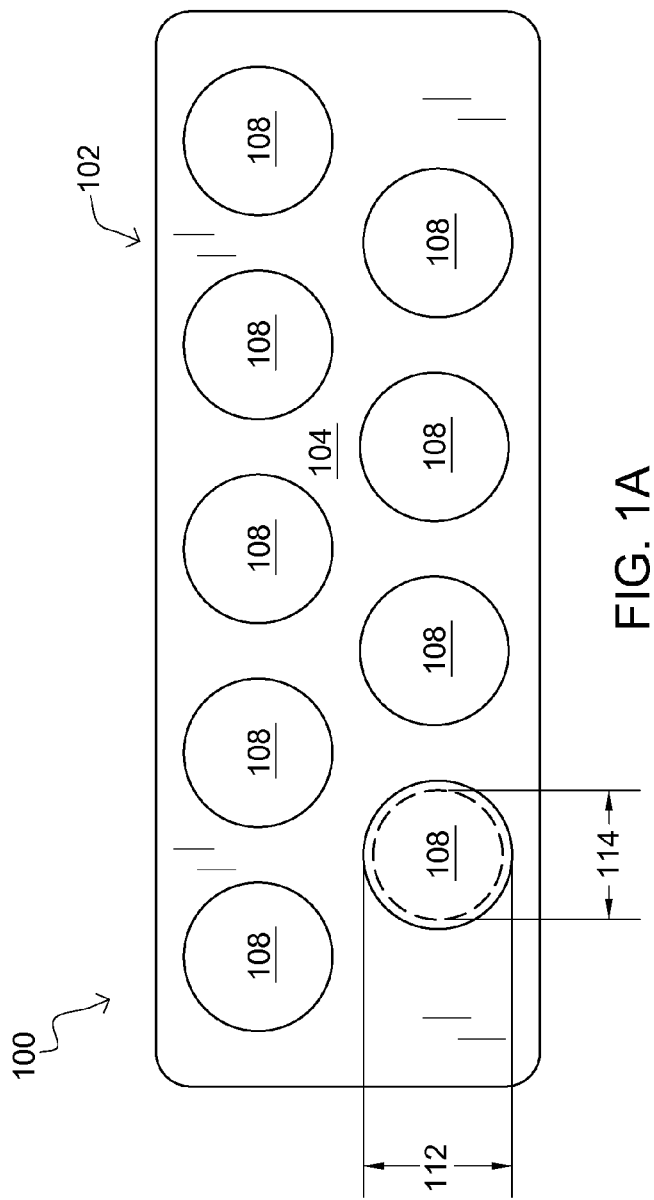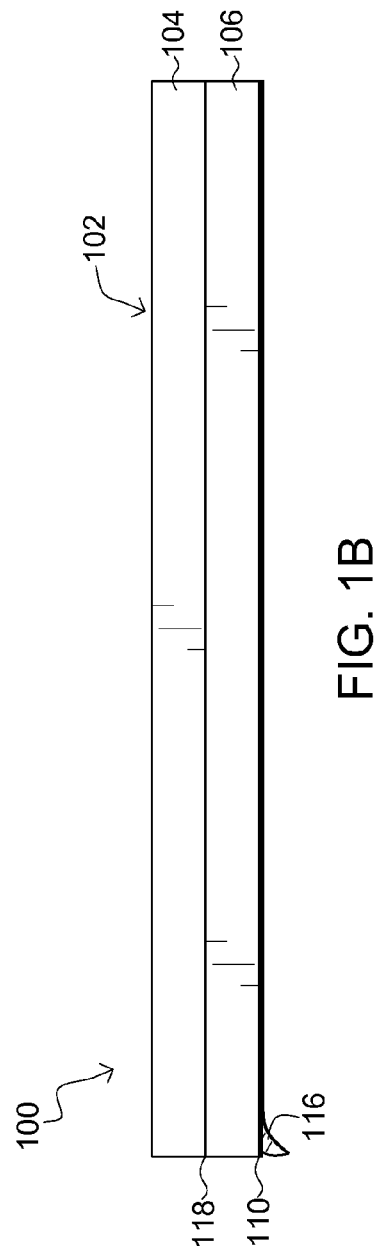
FIG. 1A
FIG. 1B

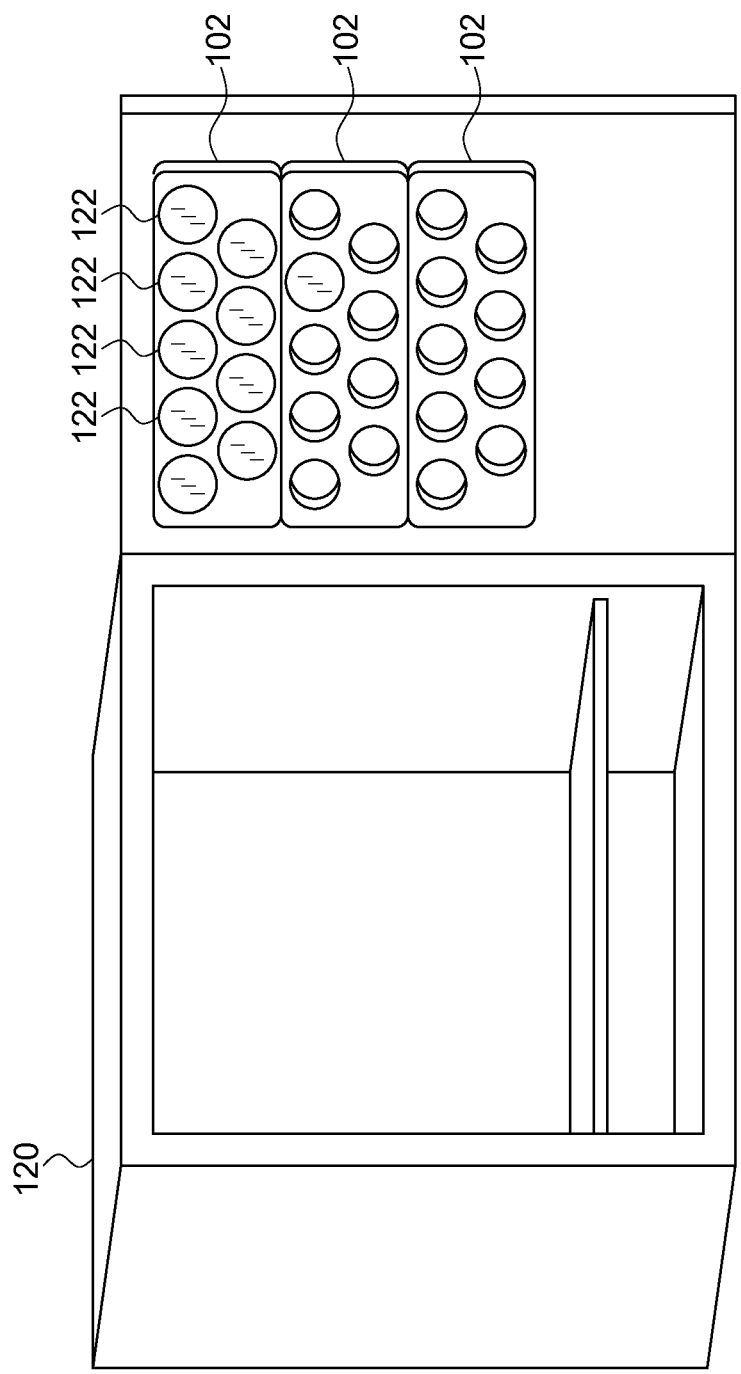

METHOD AND APPARATUS FOR BEVERAGE CAPSULE STORAGE

CROSS-REFERENCE TO RELATED APPLICATIONS

The present application incorporates by reference in its entirety U.S. Provisional Application No. 61/495,421, filed 10 Jun. 2011, which has the same inventor as the present application.

FIELD OF THE INVENTION

The present invention relates generally to storage of items. More particularly, the present invention relates to improved and efficient storage of beverage capsules.

BACKGROUND

Single cup coffee dispensers such as a Keurig® coffee maker are becoming increasingly popular. Typically, single cup coffee dispensers require a coffee pod or coffee capsule. A coffee capsule generally includes pre-ground coffee secured within a relatively small disposable container adapted to provide a single cup of coffee when used with a single cup coffee dispenser. However, storing the plurality of coffee capsules can be burdensome. The quantity of coffee capsules to be stored and readily accessible, along with the varieties of coffee and/or flavoring on labels that need to be easily seen, make effectively and efficiently storing coffee capsules arduous.

Prior art products include wire rack storage devices, for example. The problem with these types of storage devices is that they take up valuable shelf and/or cabinet space. Hence, a better apparatus and method to store coffee capsules remains a long felt need for owners of single cup coffee dispensers.

BRIEF DESCRIPTION OF THE DRAWINGS

FIG. 1A is top view of a beverage capsule storage apparatus according to a first embodiment.

FIG. 1B is a side view of the beverage capsule storage apparatus according to the first embodiment.

FIG. 2A is a perspective view of an arrangement of three beverage capsule storage apparatuses coupled to a cabinet door according to an embodiment of the present invention.

DETAILED DESCRIPTION

Figure 1C:
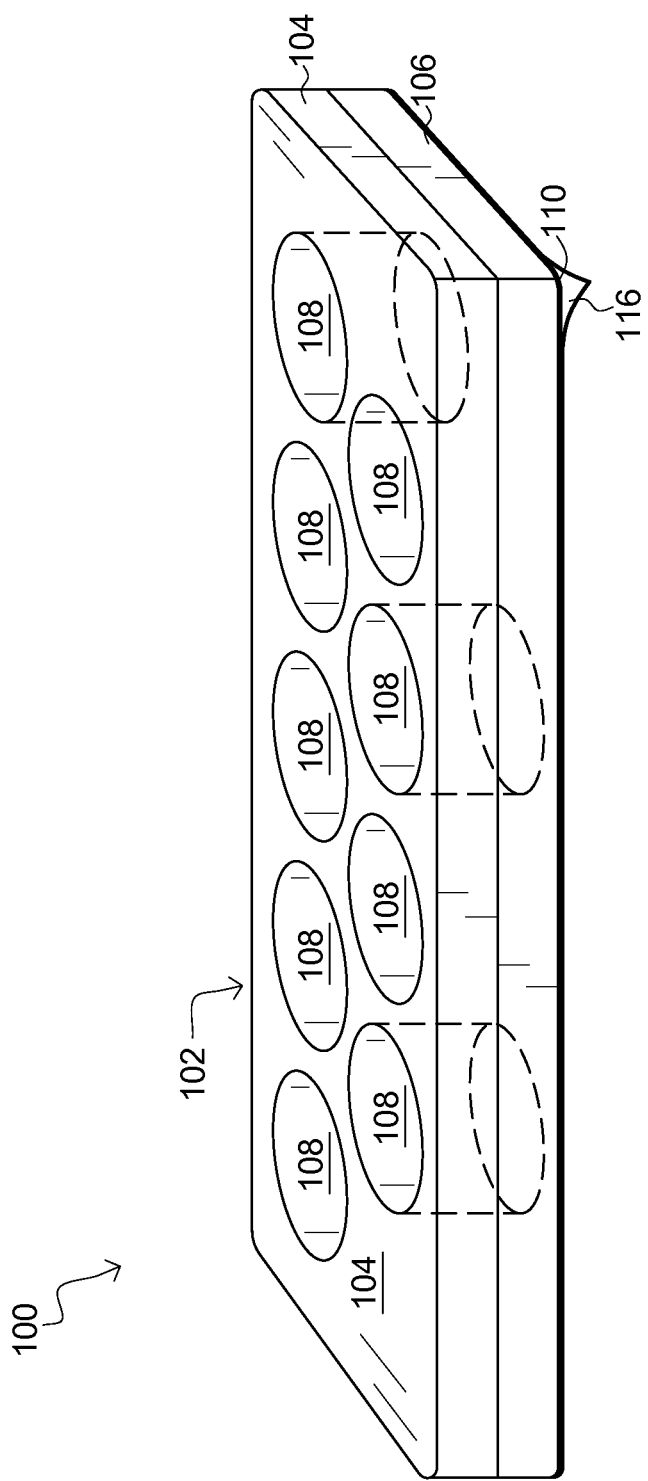
FIG. 1C is a perspective view of the beverage capsule storage apparatus according to the first embodiment.

Embodiments of the present invention comprise a beverage capsule storage apparatus adapted to store a plurality of beverage capsules. The beverage capsule storage apparatus is typically comprised of a resilient foam panel having a generally rectangular shape. The foam panel can include a plurality of apertures each adapted to receive a beverage capsule. Additionally, an adhesive layer is typically included to removably couple the apparatus to a cupboard door or other surface.

In at least one embodiment, a generally rectangular beverage capsule storage apparatus includes nine apertures into which nine beverage capsules can be stored. One or more beverage capsule storage apparatuses can be affixed on a back of a cupboard door depending on storage needs of a user. The beverage capsule storage apparatuses can be spaced to avoid one or more shelves when attached to the back of a cabinet door. Embodiments of the beverage capsule storage apparatus enable a myriad of storage operations within a kitchen thereby creating an organized appearance and saving space. Small and large sizes of the beverage capsule storage apparatus, having various shapes, are contemplated.

TERMINOLOGY

The terms and phrases as indicated in quotes (" ") in this section are intended to have the meaning ascribed to them in this Terminology section applied to them throughout this document including the claims unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive rather the term is inclusive meaning: either or both.

References in the specification to "one embodiment," "an embodiment," "an alternative embodiment," and similar phrases mean that a particular feature, structure, or characteristic described in connection with the embodiment is included in at least an embodiment of the invention. The appearances of the phrase "in one embodiment" in various places in the specification are not necessarily all meant to refer to the same embodiment.

The terms "couple" or "coupled," as used in this specification and the appended claims, refers to either an indirect or direct connection between the identified elements, components or objects. Often the manner of the coupling will be related specifically to the manner in which the two coupled elements interact.

The term "removable," "removably coupled," "readily removable," "threadably coupled," and similar terms, as used in this specification and appended claims, refer to structures that can be uncoupled from an adjoining structure with relative ease (i.e., non-destructively and without complicated or time consuming process), and can also be readily reattached or coupled to the previously adjoining structure.

Directional and/or relationary terms such as, but not limited to, left, right, top, bottom, vertical, horizontal, back, front and lateral are relative to each other and are dependent on the specific orientation of an applicable element or article, and are used accordingly to aid in the description of the various embodiments and are not necessarily intended to be construed as limiting.

As applicable, the terms "about" and "generally" as used herein unless otherwise indicated mean a margin of +−20%. Also, as applicable, the term "substantially" as used herein unless otherwise indicated means a margin of +−10%. Concerning angular measurements, "about" or "generally" refer to +−10 degrees and "substantially" refers to +−5.0 degrees unless otherwise indicated. It is to be appreciated that not all uses of the above terms are quantifiable such that the referenced ranges can be applied.

The terms "beverage capsule," "beverage pod," and "coffee pod," as used in this specification and the appended claims, can be used interchangeably and refer to a vessel containing an ingredient(s) for a single cup brewer.

A First Embodiment of a Beverage Capsule Storage Apparatus

Referring to FIGS. 1A-1C, a detailed diagram of an embodiment 100 showing an apparatus 102 from various aspects is illustrated. The apparatus 102 can be used to store beverage capsules or containers for use with single cup brewers. For instance, the apparatus 102 can be used to store K-Cups®. It is to be appreciated that the apparatus 102 can be used with most beverage capsules or containers adapted for single cup brewers.

As shown in FIGS. 1A-1C, the apparatus 102 generally comprises a first panel 104, a second panel 106, a plurality of apertures or holes 108, and an adhesive layer 110. Generally, the first panel 104 and the second panel 106 can be rectangular pieces of resilient foam. It is to be appreciated that the first panel 104 and the second panel 106 can be made into a variety of shapes. In one embodiment, the first panel 104 and the second panel 106 are each one half inch thick pieces of resilient foam. Resilient foam generally comprises any foam material that can be compressed and springs back to its original form after the compressing force is removed. It is to be appreciated that other materials such as, but not limited to, a resilient silicone-based rubber, memory foam, and elastomeric plastic may be used in addition to resilient foams.

Generally, the dual panel apparatus 102 is comprised substantially of a cross-linked polyethylene (PE) closed-cell foam. Cross-linked PE foam provides many benefits including being resilient, having shock absorption properties, having low water absorption properties, being impervious to mildew, mold, rot, and bacteria, and being non-toxic. It is to be appreciated that the dual panel apparatus 102 can be made from a variety of closed-cell foams including, but not limited to, polyethylene foam, polyethylene foam roll, polystyrene foam, and neoprene foam. In some embodiments, it is anticipated that the dual panel apparatus 102 can be made from open-cell foams, ceramics, metals, rubber, and various polymers.

During the production of most solid foams, an integral skin is generally formed on a surface of the foam. The integral skin creates an extremely dense version of the foam on the outer surfaces providing a durable protective layer. Generally, an integral skin can be included on a surface of the first panel 104 and the second panel 106.

In a general construction, the first foam panel 104 can be coupled to the second foam panel 106, as shown in FIG. 1B. An adhesive 118 can be used to couple the two panels together. The adhesive 118 in combination with the integral skins of the first panel 104 and the second panel 106 generally creates a region of rigidity in an otherwise semi-rigid material. The rigidness can provide support for a more secure interface between the foam panels and mid-sections of beverage capsules. As such, the rigid portion can allow a beverage capsule to be stored in an upside down orientation when the dual panel apparatus 102 is stored upside down.

In a preferred embodiment, the first foam panel 104 and the second foam panel 106 are comprised of closed-cell foam having a half inch thickness. When the first foam panel 104 is coupled to the second foam panel 106, a one inch thick piece of closed-cell foam is formed. As mentioned above, the coupling adhesive 118 can be implemented to couple the two panels together and provide structural support to a mid-section of the combined foam panels.

The dual panel apparatus 102 can include the adhesive layer 110 on a bottom surface of the second foam panel 106. In one embodiment, the adhesive layer 110 is a removably attachable adhesive. Generally, a rubber based pressure sensitive adhesive can be used. For example, IB1190A/IB1190AW60, manufactured by MACbond®, can be implemented. It is to be appreciated that other types of adhesive can be implemented.

Figure 2B:
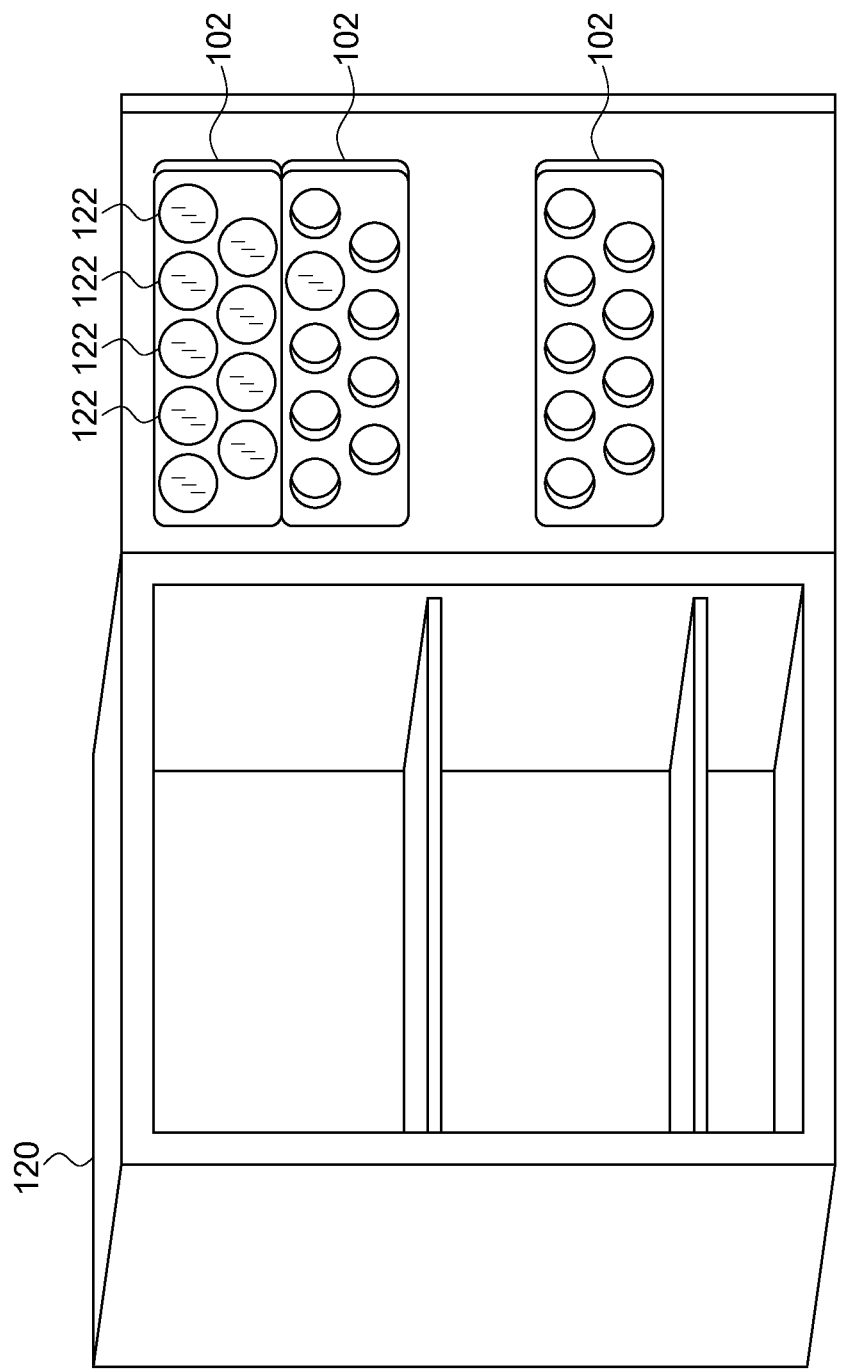
FIG. 2B is a perspective view of another arrangement of three beverage capsule storage apparatuses coupled to a cabinet door according to an embodiment of the present invention.

The adhesive layer 110 can be used to removably attach the dual panel apparatus 102 to a variety of objects. For instance, the adhesive layer 110 can attach the dual panel apparatus 102 to a kitchen cabinet 120, as shown in FIGS. 2A-2B. In another instance, the adhesive can attach the dual panel apparatus 102 to a refrigerator. It is to be appreciated that the adhesive layer 110 can be implemented to removably attach the dual panel apparatus 102 to a variety of household objects. As shown in FIG. 1B, the dual panel apparatus 102 can include a release paper 116. In one embodiment, the adhesive layer 110 can be a generally more permanent pressure sensitive adhesive that is adapted to not be removably attachable. For example, the adhesive layer 110 can be a one time application pressure sensitive adhesive.

In some embodiments, the adhesive layer 110 can be replaced with other attachment mechanisms. For instance, magnets can be implemented with the dual panel apparatus 102 to attach to a refrigerator. In such embodiments, cavities can be provided in corners of the dual panel apparatus 102 to house the magnets. In one embodiment, nails or screws can be implemented to more permanently attach the dual panel apparatus 102 to cabinets or other wood objects in a kitchen. It is to be appreciated that a variety of mechanisms can be implemented to secure the dual panel apparatus 102 to an object. Examples of attachment mechanisms include, but are not limited to, hook and loop fasteners, double sided tape, magnetic assemblies, or mounting hardware (e.g., screws, nails, etc.).

The adhesive layer 110 is typically included to couple the dual panel apparatus 102 to a cupboard door or other surface such as, but not limited to, a refrigerator, backsplash, wall, or pantry door. As shown in FIGS. 2A-2B, one or more of the apparatuses 102 can be affixed on a back of a cupboard door 120, such that the apparatuses 102 can be spaced to avoid one of more shelves. In one example, the one or more apparatuses 102 can be affixed non-contiguously to avoid a shelf, as shown in FIG. 2B. As shown in FIGS. 2A-2B, the dual panel apparatus 102 is adapted to store a plurality of beverage capsules 122. In some implementations, the dual panel apparatus 102 can be placed in a drawer without any attachment mechanism.

The dual panel apparatus 102 can include the plurality of apertures 108 to store beverage capsules. As shown in FIG. 1A, the apertures 108 can have a first diameter 112 located proximate a top surface of the first foam panel 104 and a second diameter 114 located proximate a bottom surface of the second foam panel 106. In one embodiment, the apertures 108 can be tapered from the top surface of the first foam panel 104 to the bottom surface of the second foam panel 106. In another embodiment, the apertures 108 can have a uniform diameter from the top surface of the first foam panel 104 to the bottom surface of the second foam panel 106. Generally, the apertures 108 can be configured to receive a beverage capsule for storage. For example, the first diameter 112 of the apertures 108 can be larger than the smallest diameter of a beverage capsule, but smaller than the largest diameter of the beverage capsule. Furthermore, the second diameter 114 of the apertures 108 can be approximately the same size as the smallest diameter of the beverage capsule. In such a construction, a top portion of the apertures 108 can receive a bottom portion of the beverage capsule, and a bottom portion of the apertures 108 can embrace the bottom portion of the beverage capsule.

Important in some embodiments is a relationship between a diameter and slightly frustoconical structure of the apertures 108 as compared to a diameter and slightly frustoconical structure of a beverage capsule. A standard beverage capsule typically has a top body diameter of 1.736 inches and a bottom body diameter of 1.455 inches. With such dimensions, the beverage capsule has a more angled, or pointed, frustoconical shape than that of the apertures 108. Moreover, the bottom body diameter of the standard beverage capsule is smaller than an opening of the apertures 108, while the top body diameter of the standard beverage capsule is larger than the opening of the apertures 108. In some embodiments, the diameter and slightly frustoconical structure of the apertures 108 and the beverage capsule may be exactly, or near exactly, matched. These characteristics of the apertures 108, as well as the spacing thereof, provide an easy to use and safely securing storage means for beverage capsules. It is to be appreciated that in some embodiments, the beverage capsules can even be stored in an upside down configuration. For example, the dual panel apparatus 102 can be mounted on the underside of a cabinet.

In a preferred embodiment, the first foam panel 104 and the second foam panel 106 can each be cut from a piece of closed-cell foam into 11×4×½ inch panels. An adhesive can be used to couple the first foam panel 104 to the second foam panel 106. After the panels are coupled, the apertures 108 can be die cut into two rows. A first row can have five apertures and a second row can have four apertures, where the two rows are typically staggered. The apertures 108 can be spaced approximately ¾ of an inch apart. A first diameter of the apertures 108, located proximate a top surface of the first foam panel 104, can be 1.630 inches and a second diameter, located proximate a bottom surface of the second foam panel 106, can be 1.455 inches. As such, the apertures 108 can taper gradually from the first diameter to the second diameter. To secure to the dual panel apparatus 102 to household objects, the bottom surface of the second foam panel 106 can include a rubber based pressure sensitive adhesive layer.

It is to be appreciated that other smaller sizes and larger sizes of the dual panel apparatus 102, having various shapes, are contemplated and within the scope of this disclosure. Additionally, some versions of the dual panel apparatus 102 can include a shell or housing. The shell can be comprised of various materials to increase aesthetic aspects of the dual panel apparatus 102. For example, stainless steel or granite veneer can be used as a shell for the dual panel apparatus 102. For less expensive versions, the shell can be constructed from a variety of colored plastics. Moreover, a spray coating may be applied directly to the memory foam body or like body, as well as the shell, if one is included in order to match the color of the dual panel apparatus 102 with cabinetry or other surfaces.

A Second Embodiment of a Beverage Capsule Storage Apparatus

Figure 3A:
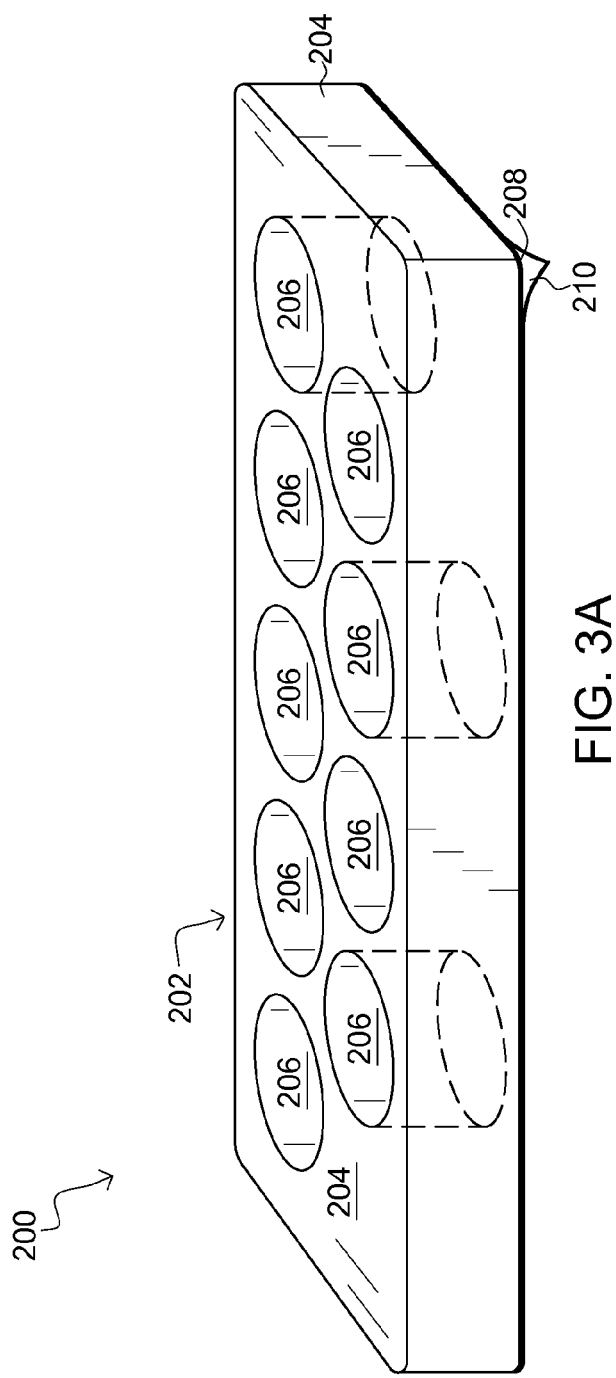
FIG. 3A is a perspective view of a beverage capsule storage apparatus according to a second embodiment.
Figure 3B:
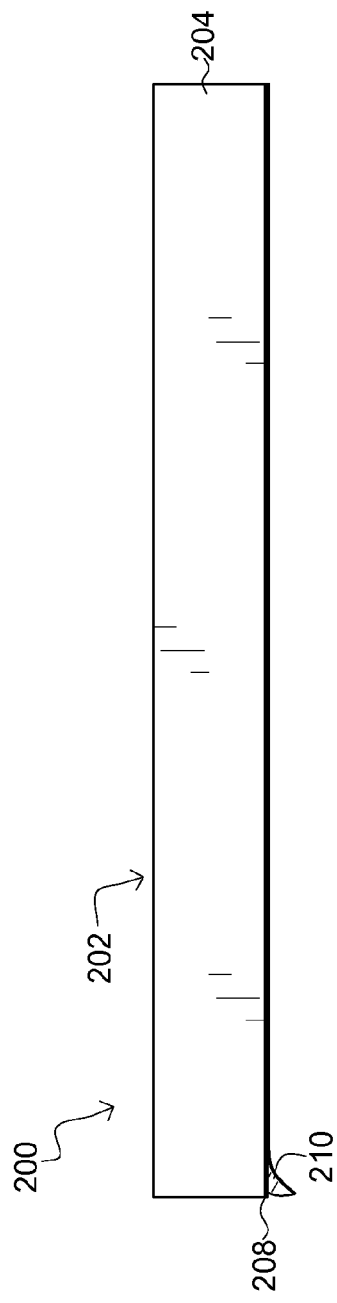
FIG. 3B is a side view of the beverage capsule storage apparatus according to the second embodiment.

Referring to FIGS. 3A-3B, detailed diagrams of an embodiment 200 showing an apparatus 202 are illustrated. The apparatus 202 can be used to store beverage capsules or containers for use with single cup brewers. For instance, the apparatus 202 can be used to store K-Cups®. It is to be appreciated that the apparatus 202 can be used with most beverage capsules and/or containers for single cup brewers.

As shown in FIGS. 3A-3B, the apparatus 202 generally comprises a panel 204, a plurality of apertures or holes 206, and an adhesive layer 208. The apparatus 202 is similar to the first embodiment apparatus 102.

FIG. 2B is a side view of the single panel apparatus 202. As shown, the apparatus 202 includes the single panel 204 of foam in contrast to two panels of the first embodiment. The panel 204 generally comprises a resilient foam or similar material. For example, the panel 204 can be made from rubber. In another example, the panel can be made of a pliable plastic. It is to be appreciated that the panel 204 can be made from a variety of materials including, but not limited to, closed-cell foams, open-cell foams, ceramics, metals, rubber, and various polymers.

In a preferred embodiment, the panel 204 comprises a closed-cell foam having a rectangular shape and a one inch thickness. The foam panel 204 further includes the plurality of apertures 206. Generally, the single panel apparatus 202 includes nine apertures separated into two rows. One row can have five apertures and a second row can have four apertures. It is to be appreciated that more or less than two rows can be implemented with the single panel apparatus 202. The apertures 206 are adapted to hold or store a standard beverage capsule. The adhesive layer 208 can be included to removably attach the single panel apparatus 202 to an object. Generally, the adhesive 208 is located on a bottom surface of the foam panel 204. It is to be appreciated that a release paper 210 is typically included with the adhesive layer 208.

In one embodiment, the apertures 206 are formed by a die-cutting process. It is to be appreciated that other means of forming the apertures 206 can be implemented without exceeding the scope of this disclosure.

The apparatus 202 can be removably attached to a variety of objects. As shown in FIGS. 2A-2B, the apparatus 202 can be attached to a back side of a cabinet door, similar to the dual panel apparatus 102. One or more of the apparatuses 202 can be spaced such that the apparatuses do not interfere with shelves of the cabinet, as shown in FIGS. 2A-2B. In another example, the apparatus 202 can be removably attached to an underside of a cabinet.

A Method of Implementing a Beverage Capsule Storage Apparatus

Figure 4:
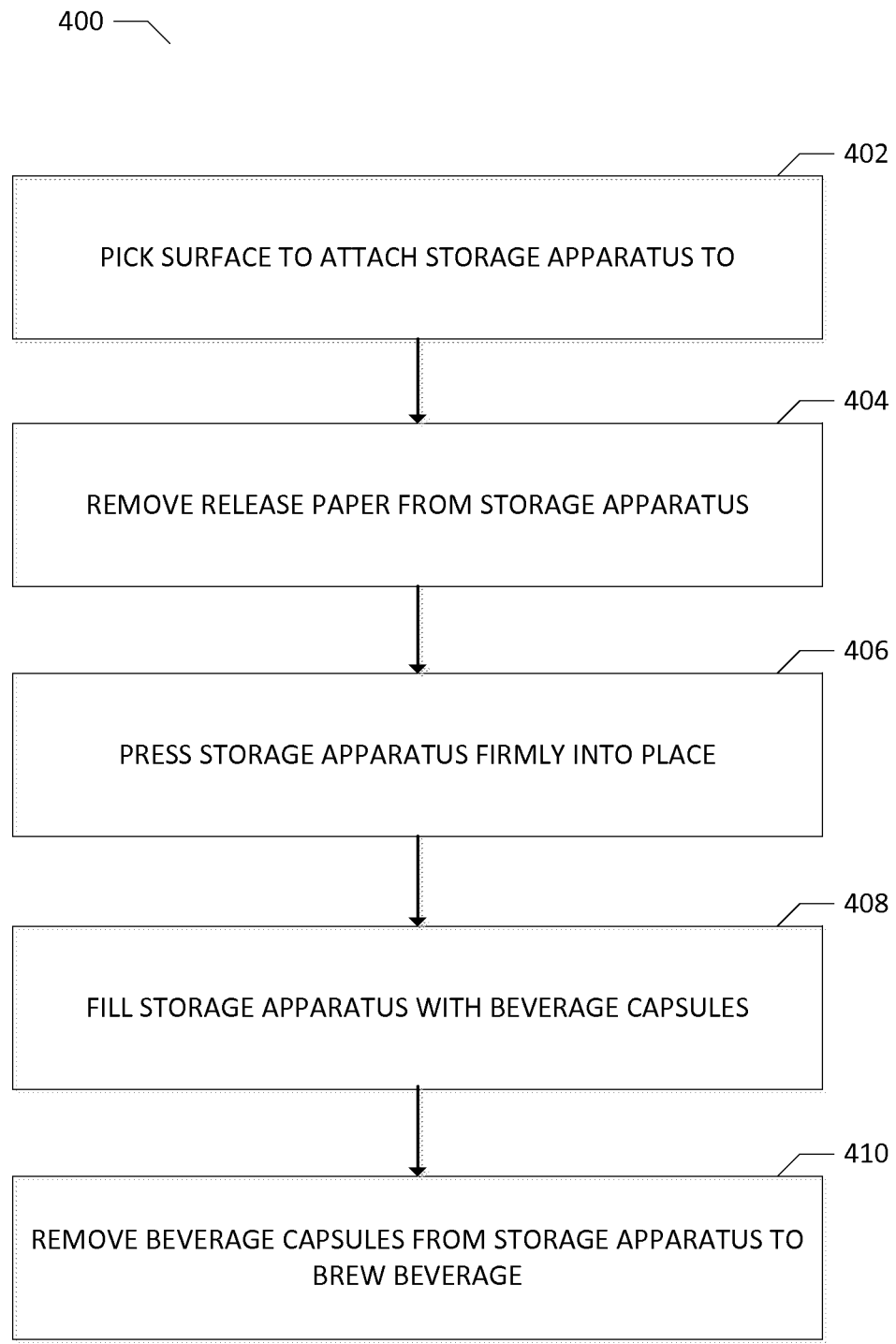
FIG. 4 is a flow chart depicting how to implement an embodiment of the present invention.

FIG. 4 illustrates an embodiment 400 of a method for implementing a beverage capsule storage apparatus in a household.

First, a surface can be picked out to removably attach the storage apparatus to in block 402. For example, the storage apparatus can be attached to a cabinet door or refrigerator. After the surface is picked out, a release paper can be removed from the storage apparatus to expose an adhesive on an underside of the storage apparatus in block 404. With the adhesive side down, the storage apparatus can be can be pressed firmly into place in block 406. After the storage apparatus is firmly in place, beverage capsules can be added into apertures of the storage apparatus for storing in block 408. A user can remove one or more beverage capsules for brewing a beverage in block 410.

Alternative Embodiments and Variations

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

I claim:

1. A combination comprising:
   an apparatus for storing beverage capsules, the apparatus comprising (i) a closed-cell foam panel, (ii) a plurality of apertures within the foam panel, each of the plurality of apertures adapted to hold a beverage capsule, and (iii) an adhesive layer on a bottom surface of the foam panel, the adhesive layer adapted to removably secure the foam panel to an object;
   a cabinet door, wherein the apparatus is coupled to the cabinet door; and
   one or more beverage capsules secured in the plurality of apertures.

2. The combination of claim 1, wherein the closed cell foam panel comprises:
   a first piece of closed-cell foam; and
   a second piece of closed-cell foam coupled to the first piece of closed-cell foam, wherein the coupling comprises an adhesive.

3. The combination of claim 2, wherein the apertures are generally rigid proximate a location of the coupling of the first piece of foam to the second piece of foam.

4. The combination of claim 1, wherein each of the plurality of apertures has a first diameter located proximate a top surface of the foam panel and a second diameter located proximate the bottom surface of the foam panel.

5. The combination of claim 4, wherein each of the plurality of apertures tapers from the first diameter to the second diameter.

6. The combination of claim 5, wherein the first diameter is greater than the second diameter.

7. The combination of claim 6, wherein the first diameter is approximately 1.630 inches and the second diameter is approximately 1.455 inches.

8. The combination of claim 4, wherein the first diameter is equal in size to the second diameter.

9. The combination of claim 1, wherein the plurality of apertures are arranged in two rows.

10. The combination of claim 9, wherein a first row has five apertures and a second row has four apertures.

11. The combination of claim 10, wherein the first row and the second row are staggered.

12. The combination of claim 1, wherein the foam panel has approximately a one inch thickness.

13. The combination of claim 1, wherein the adhesive layer is a rubber based pressure sensitive adhesive.

14. The combination of claim 1, wherein a color of the foam panel is matched to a color of the cabinet door.

15. A combination comprising:
    a kitchen cabinet;
    an apparatus for storing beverage capsules, the apparatus comprising (i) a closed-cell foam panel, (ii) a plurality of apertures within the foam panel, each of the plurality of apertures adapted to hold a beverage capsule, and (iii) an adhesive layer on a bottom surface of the foam panel, the foam panel being removably secured the foam panel to a surface of the cabinet by the adhesive layer; and
    one or more beverage capsules secured in the plurality of apertures.

16. The combination of claim 15, wherein each of the plurality of apertures has a first diameter located proximate a top surface of the foam panel and a second diameter located proximate the bottom surface of the foam panel.

17. The combination of claim 16, wherein each of the plurality of apertures tapers from the first diameter to the second diameter.

18. The combination of claim 17, wherein the first diameter is greater than the second diameter.

19. The combination of claim 18, wherein the first diameter is approximately 1.630 inches and the second diameter is approximately 1.455 inches.

* * * * *